Jan. 28, 1958    M. D. O'DAY    2,821,704
NAVIGATION SYSTEM
Filed Nov. 30, 1945

INVENTOR
MARCUS D. O'DAY
BY *M. O. Hayes*
ATTORNEY

United States Patent Office 2,821,704
Patented Jan. 28, 1958

2,821,704

NAVIGATION SYSTEM

Marcus D. O'Day, Arlington, Mass., assignor, by mesne assignments, to the United States of America as represented by the Secretary of the Navy Application November 30, 1945, Serial No. 631,952

6 Claims. (Cl. 343—15)

This invention relates to ground control navigation systems, and more particularly to a system intended for short range navigation or blind landing approach of aircraft.

The conventional ground-controlled navigation system is composed of two ground stations each with accurate ranging circuits, and by maintaining a three-way communication channel, an airplane can be guided accurately to its destination.

One object of this invention is to provide a system for determining the position of a ship, such as an aircraft, while using only one control station, instead of two.

Another object of this invention is to provide a system for determining the position of a ship without transmitting timing data between two locating stations, or between two locating stations and a ship. From another viewpoint, this object of the invention is to provide a position determining system having the timing circuits confined to one control station.

A further object of this invention is to provide a system for the blind landing approach or navigation of an aircraft.

Still further objects of this invention will become apparent as these new systems are herein explained.

The invention will be described by referring to the accompanying drawing, in which.

Figure 1:
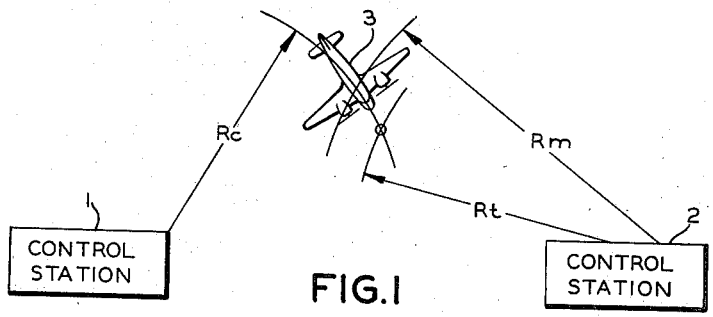
Fig. 1 is a diagram of a conventional two station ground control navigation system.

Referring to Fig. 1, the usual method is to have the plane 3 fly a course of constant radius Rc from station 1 and to have the station 2 constantly measure range Rm which is the distance from station 2 to plane 3, and to transmit a signal when the range Rm equals a predetermined target range of Rt. This type of navigation system requires that there be two sets of accurate ranging circuits, and that the communication between the two stations 1 and 2 and between the two said stations and planes be closely maintained. In brief, two complete control stations are required.

Figure 2:
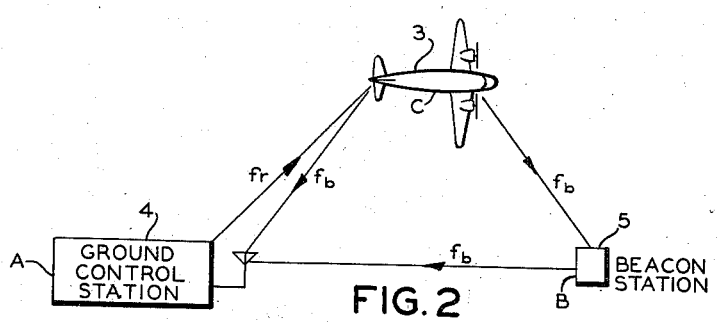
Fig. 2 is a block diagram of an embodiment of the invention, particularly useful in aerial navigation.
Figure 3:
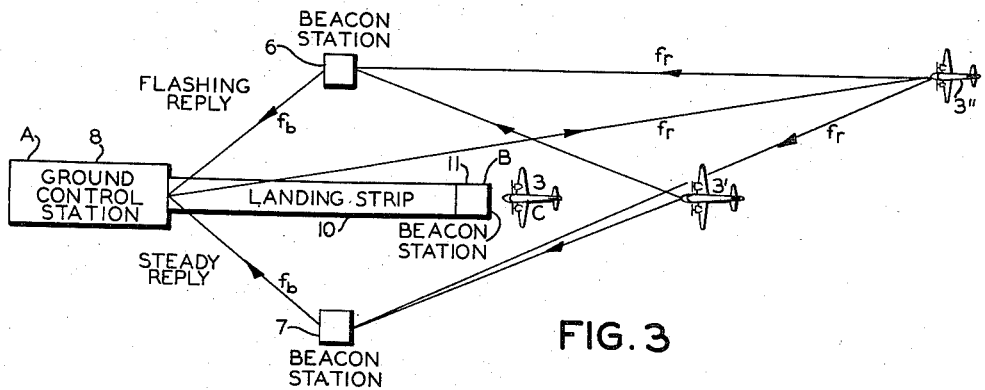
Figs. 3 and 4 illustrate a second embodiment of the invention particularly useful in the blind landing approach of aircraft.
Figure 4:
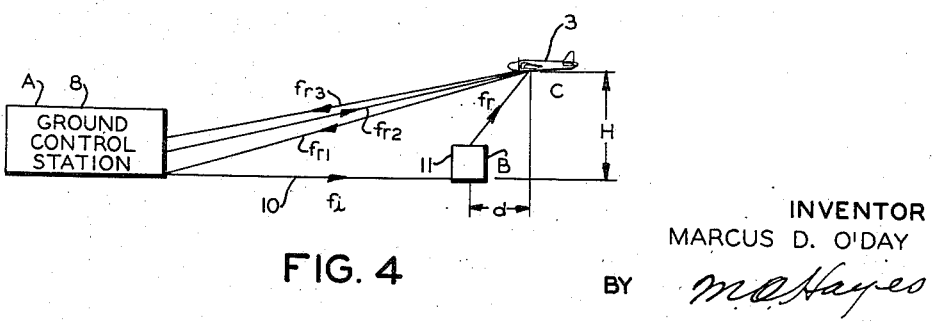

In accordance with the present invention only one control station is needed. One form of the invention used for navigation is shown in Fig. 2. Another form of the invention used for blind landing approach is shown in Figs. 3 and 4. In both forms of the invention there is a single ground control station A; a fixed beacon or transponder B spaced from the ground control station and replacing the second control station ordinarily required, and another beacon or transponder C carried by the ship which is being guided. In both cases the control station A transmits a pulse signal to cause the beacon C on the ship to radiate a pulse signal back directly to the control station. The transmitted pulse signal also causes transmission of another pulse signal back to the control station via both the ship C and the fixed beacon B. In both cases appropriate means is provided at the ground control station A, responsive to the two different pulse signals received there, for indicating the difference in arrival time of the pulse signals which have been received over the relatively shorter path by direct return from the aircraft, and the relatively longer path going by way of the fixed beacon B. The distance between the ground control station A and the beacon B must be fixed in the case of navigation, and must be both fixed and known in the case of blind landing approach. For navigation it is not necessary to know the actual distance since the system may be calibrated by observing the time difference between the two different pulse signals for various known positions of a plane 3, and the data thus obtained may be used in solving the navigation problem. For blind landing approach, however, the distance from station A to beacon B ordinarily will be known, and should be in order to successfully solve the triangles involved.

The navigation system of Fig. 2 includes a control station 4, a beacon station 5, a second beacon carried by plane 3, and a communication receiver of the double-pulse variety in plane 3 so that the plane may receive instruction by means of dot-dash code from ground station 4 over the pulse channel. Such a method of transmission consists of transmitting a series of pairs of pulse signals, the first pulse signal triggering the beacon in the plane and the second pulse signal carrying the communication and occurring at some variable time later than the first pulse signal. A pair of headphones connected to the output of a suitable receiver in the plane will indicate a note of the frequency at the recurrence rate of the system. This type communication is desirous when security is to be maintained.

Control station 4 comprises a high powered transmitter, and a receiver system which receives pulse signals from the beacon station 5 and from the beacon in plane 3. Beacon station 5 and the beacon in plane 3 each comprise a receiver and a transmitter (transponder) which is triggered to transmit a pulse signal in response to a received pulse signal. The transmitter of beacon station 5 is high powered.

In operation, control station 4 sends out a pulse signal of a frequency $f_r$ which is directed by the antenna towards plane 3, and which triggers the beacon on the plane. The transmitted pulse signal from this beacon is of a different frequency $f_b$ from the pulse signal from station 4, and is received by beacon station 5 tuned to the frequency $f_b$. Station 5 in turn transmits a pulse signal in response to the received trigger pulse signal, and at the same frequency $f_b$. The receiver at main control station 4 is tuned to the frequency $f_b$, and hence will receive the transmitted pulse signal from the beacon in plane 3 as well as the transmitted pulse signal from beacon station 5.

Because control station 4 is provided with timing circuits which operate with a high degree of accuracy, the position of the aircraft 3 can be precisely found. This can be accomplished either by triangulation, if the distance of the base line between station 4 and beacon 5 is known or, as is often done in practice, without knowing the distance at said base line, from data obtained by calibrating the system. The calibration procedure consists of sending out a ship, such as an airplane, which flies over several known positions in a given region or area. As the plane flies directly over each of the known positions the pilot radios his position to the ground station and there the range or time differences between the two different pulse signals are recorded. From the accumulation of this data calibration curves can be drawn, and other navigation problems can be solved.

Considering the above from a different view, it is apparent that the control station 4 gives the range of the plane 3 very accurately. However, the accuracy of azimuth information is limited by the finite beam width of the search system. Therefore, to improve, azimuth resolution, the accurate range data furnished by beacon station 5 is used to supply azimuth information of the desired accuracy.

The system also is readily and easily adapted to the blind landing approach problem. Figs. 3 and 4 show block diagrams of such a blind landing approach system. Fig. 3 includes a directional transmitter and receiver located at ground control station 8 at one end of the landing strip 10 and two beacon stations 6 and 7 placed symetrically on either side of said strip 10. A third beacon 11 is located at the other end of the strip. A fourth beacon is located in plane 3" which is to be brought in for a landing, and its reply frequency is different from that used when navigating. This can be accomplished by throwing a switch in the plane when instructed to do so by the ground control station 8.

Station 8 comprises a transmitter which sends a pulse signal toward plane 3 by means of its directional antenna, and a receiver which receives pulse signals from the two beacon stations 6 and 7. Beacon stations 6 and 7 and plane 3 each comprise a beacon receiver and transmitter. These transmitters will transmit a pulse signal in response to a pulse signal received by the receiver. In operation, a pulse signal of frequency $fr$ is transmitted from station 8 toward plane 3" being guided. The beacon in plane 3" is triggered by this frequency $fr$ and transmits a pulse signal of the same frequency $fr$. Beacon stations 6 and 7 being tuned to receive frequency $fr$, are triggered and each transmits a pulse signal of a different frequency $fb$ which is received by station 8. By using an accurate cathode ray tube indicator, the ground control station 8 can direct plane 3" over the regular communication channel until the two replies from stations 6 and 7 displayed on the indicating means show the plane is flying a proper course for landing, as is indicated at 3'. In order to distinguish which reply comes from which of the ground beacon stations 6 and 7, the duty cycle of one of these beacon stations is gated off and on so that it presents a flickering or flashing indication on the scope of the indicating means. With plane 3' properly lined up on the correct course for landing, there will be no time differential between pulses received from beacons 6 and 7. It then becomes necessary to inform the pilot of the distance from the end of the runway 10, and the altitude of his plane. How this may be accomplished will be apparent from Fig. 4 with the following explanation.

Fig. 4 again shows the ground control station 8, the beacon station 11, and the plane 3 which is to be brought in for landing. Control station 8 comprises, in addition to the previously mentioned transmitter and receiver system, a low power transmitter with its own directional antenna, and a second receiver. The first transmitter transmits a pulse signal toward plane 3 by means of its main antenna, and the low power transmitter transmits a pulse signal toward beacon station 11 by means of the additional directional antenna. Both transmitters are synchronized together. The second or additional receiver receives pulse signals from the beacon in plane 3. Beacon station 11 at the end of the landing strip 10, and plane 3, each includes a beacon receiver and transmitter. In operation, as soon as an approaching plane 3 is placed properly in azimuth the low powered transmitter at station 8 is put in operation and interrogates or sends out a pulse signal of a different frequency $fi$ beamed toward beacon station 11 at the end of runway 10. Station 11 being tuned to the frequency $fi$ is triggered and transmits a pulse signal of frequency $fr$. The beacon in plane 3 being tuned to the frequency $fr$ receives pulse signals of this frequency, and transmits a pulse signal $fr1$. The pulse signal $fr1$ transmitted from plane 3 is received by control station 8. The original transmitter at control station 8 continues to interrogate or send out a pulse signal $fr2$ beamed toward the plane 3. The beacon in plane 3 is triggered and transmits a pulse signal $fr3$, which is received by control station 8. The different pulse signals $fr1$, $fr2$, and $fr3$ all have the same carrier frequency, $fr$.

From the foregoing explanation it is seen that by knowing the length of the landing strip 10, the time range from station 8 to plane 3 and the time range from station 8 to beacon 11 to plane 3 back to station 8, and by using an accurate timing circuit and a triangle solver, the altitude $h$ of plane 3 and the distance $d$ which plane 3 must go before reaching landing strip 10 can be found. The addition of the low-powered transmitter and the second receiver and using the equipment already available make such a blind landing system possible.

The invention described in the foregoing specification need not be limited to the details shown, which are considered to be illustrative of one form the invention may take.

What is claimed is:

1. In an aircraft landing approach system having a control station at one end of the landing strip and first and second beacon stations equally spaced from said control station on opposite sides of said landing strip, the combination of means at said control station for radiating a directional beam of pulses of a first radio frequency toward said aircraft, means carried by said aircraft responsive to the detection of said pulses for reradiating similar pulses of the same radio frequency toward said beacons, means at both beacons responsive to the detection of said last-mentioned pulses for radiating pulses of a second radio frequency toward said control station, and means at said control station for detecting pulses of said second radio frequency and for indicating the time difference in arrival of corresponding pulses of said second radio frequency radiated by said beacons, said time difference indicating the relative azimuthal position of said aircraft with respect to the center line of said landing strip.

2. In an aircraft landing approach system wherein a control station is positioned at one end of the landing strip and first and second beacon stations are equally spaced therefrom on opposite sides of said landing strip, apparatus for indicating the azimuthal displacement of said aircraft from the center line of said landing strip comprising, means at said control station for radiating in a directional beam pulses of a first radio frequency toward said aircraft, means in said aircraft responsive to the detection of pulses of said first radio frequency for reradiating similar pulses of the said radio frequency toward said beacons, means at said first beacon for radiating toward said control station a pulse of a second radio frequency for every pulse of said first radio frequency detected thereat, means at said second beacon for radiating toward said control station a pulse at said second radio frequency for a predetermined number of pulses of said first radio frequency detected thereat, and means at said control station for detecting pulses of said second radio frequency and for indicating the difference in the time of arrival of a pair of these pulses radiated from said first and second beacon stations, respectively, said last-mentioned means providing an indication of the relative azimuthal location of said aircraft with respect to the center line of said landing strip.

3. Apparatus for determining the altitude and distance of an aircraft which is lined up with the center line of a landing strip at one end of which is located a control station and at the other end of which is located a beacon station comprising, means at said control station for simultaneously radiating pulses of a first radio frequency in the directional beam toward said aircraft and relatively low power pulses of a second radio frequency toward said beacon station, means at said beacon station responsive to the detection of said low power pulses of said second radio frequency for radiating pulses of said first radio frequency toward said aircraft, means in said aircraft responsive to the detection of radio frequency pulses of said first frequency for reradiating similar pulses of the same frequency toward said control station, and means at said control station for providing an indication of the time intervals between the radiation of a particular low power pulse and the subsequent detection by said control station of the next pair of pulses of said first radio frequency.

4. In an aircraft blind landing approach radio pulse system having a control station at one end of a landing strip and first and second beacon stations spaced from said control station and from each other on opposite sides of said landing strip, apparatus for determining the position of said aircraft comprising means at said control station for transmitting a pulse signal at a first frequency toward said aircraft, means in said aircraft for transmitting a second pulse signal of the same frequency as said first-mentioned signal pulse in response to said first-mentioned signal pulse, means at said first and second beacon stations responsive to said second signal pulse to transmit a pulse signal from each beacon station at a second frequency different from said first-mentioned signal pulse, means at said control station responsive to signal pulses at said second frequency from said first and second beacon stations for indicating difference of arrival time of said signal pulses from said first and second beacon stations.

5. In an aircraft blind landing approach radio pulse system having a control station at one end of a landing strip and a beacon station spaced from said control station at the other end of said landing strip, apparatus for determining altitude and distance to said aircraft comprising, means at said control station for transmitting first and second synchronized pulse signals, the first of said pulses being directed toward said beacon station, means at said beacon station responsive to said first signal pulse to transmit a third signal pulse, means on said aircraft responsive to said third signal pulse for transmitting a fourth signal pulse, said second signal pulse being directed toward said aircraft, said transmitting means on said aircraft also being responsive to said second signal pulse to transmit a fifth signal pulse, and means at said control station responsive to said fourth and fifth signal pulses for indicating the difference in time between the arrival of said fourth and fifth signal pulses.

6. In an aircraft blind landing approach radio pulse system having a control station at one end of a landing strip and a beacon station spaced from said control station at the other end of said landing strip, apparatus for determining altitude and distance to said aircraft comprising, means at said control station for transmitting first and second synchronized signal pulses of different frequencies, the first of said pulses being directed toward said beacon station and the second of said pulses toward said aircraft, means at said beacon station responsive to said first signal pulse to transmit a third signal pulse having the same frequency as said second pulse, means on said aircraft responsive to said second and third signal pulses for transmitting a fourth and a fifth pulse respectively having the same frequency as said second and third pulses, means at said control station for indicating the difference in time of arrival of said fourth and fifth pulses.

References Cited in the file of this patent
UNITED STATES PATENTS

| | | |
|---|---|---|
| 2,169,374 | Roberts | Aug. 15, 1939 |
| 2,288,196 | Kramer | June 30, 1942 |
| 2,403,626 | Wolff | July 9, 1946 |
| 2,405,238 | Seeley | Aug. 6, 1946 |
| 2,406,953 | Lewis | Sept. 3, 1946 |
| 2,408,048 | Deloraine | Sept. 24, 1946 |
| 2,420,408 | Behn | May 13, 1947 |
| 2,433,381 | Marchand | Dec. 30, 1947 |
| 2,470,787 | Nosker | May 24, 1949 |
| 2,480,123 | Deloraine et al. | Aug. 30, 1949 |
| 2,515,332 | Budenbom | July 18, 1950 |